US006620500B2

(12) United States Patent
Sweet et al.

(10) Patent No.: US 6,620,500 B2
(45) Date of Patent: Sep. 16, 2003

(54) DRY ERASE MEMBER

(75) Inventors: Norman Sweet, Waterford, MI (US); Scott Ryan Zavada, Holly, MI (US); Patricia Ann Plummer, Brighton, MI (US)

(73) Assignee: Precision Coatings, Inc., Walled Lake, MI (US)

( * ) Notice: Subject to any disclaimer, the term of this patent is extended or adjusted under 35 U.S.C. 154(b) by 195 days.

(21) Appl. No.: 09/754,151

(22) Filed: Jan. 4, 2001

(65) Prior Publication Data

US 2001/0024720 A1 Sep. 27, 2001

Related U.S. Application Data

(60) Provisional application No. 60/174,868, filed on Jan. 7, 2000.

(51) Int. Cl.[7] .............................. B32B 7/12; B41N 1/00

(52) U.S. Cl. ............................... 428/355 RA; 428/343; 428/354; 428/41.8; 101/478

(58) Field of Search ................................ 428/343, 354, 428/41.8, 355 RA; 101/478

(56) References Cited

U.S. PATENT DOCUMENTS

| | | | | | |
|---|---|---|---|---|---|
| 4,680,204 | A | | 7/1987 | Das et al. | 427/407.1 |
| 4,996,110 | A | | 2/1991 | Tanuma et al. | 428/343 |
| 5,024,898 | A | * | 6/1991 | Pitts et al. | 428/511 |
| 5,037,702 | A | | 8/1991 | Pitts et al. | 428/423.7 |
| 5,223,323 | A | | 6/1993 | Dickerhof et al. | 428/143 |
| 5,270,100 | A | | 12/1993 | Giglio | 428/195 |
| 5,310,597 | A | * | 5/1994 | Cray et al. | 428/266 |
| 5,407,995 | A | | 4/1995 | Hintze-Bruning et al. | 524/539 |
| 5,527,568 | A | | 6/1996 | Boone et al. | 428/14 |
| D377,948 | S | | 2/1997 | Pruhs | D19/52 |
| 5,658,635 | A | | 8/1997 | Davis et al. | 428/81 |
| 5,716,685 | A | | 2/1998 | Kumar et al. | 428/40.1 |
| 5,743,414 | A | | 4/1998 | Baudino | 211/69.1 |
| 5,976,663 | A | | 11/1999 | Davis et al. | 428/81 |
| 5,987,825 | A | | 11/1999 | Rosen | 52/36.1 |

OTHER PUBLICATIONS

Derwent Abstract of JP 61200145A.*
Derwent Abstract of JP 59059440A.*

* cited by examiner

*Primary Examiner*—Daniel Zirker
*Assistant Examiner*—Victor S. Chang
(74) *Attorney, Agent, or Firm*—Gifford, Krass, Groh, Sprinkle, Anderson & Citkowski, P.C.

(57) ABSTRACT

A dry erase member for receiving and releasably retaining a marking composition comprises a substrate coated with a layer of dry erase material on a first face thereof. In specific embodiments, the dry erase coating includes a major amount of a fluorinated polymer or a cellulose acetate based polymer, together with a minor amount of a melamine resin. The dry erase member may include a layer of adhesive on a second face of the substrate to allow for temporary or permanent mounting of the dry erase member onto a surface. In specific embodiments, the dry erase member is flexible. Also disclosed is a dust retaining strip for use with dry erase boards.

12 Claims, 1 Drawing Sheet

DRY ERASE MEMBER

RELATED APPLICATION

This patent application claims priority of Provisional Patent Application Serial No. 60/174,868 filed Jan. 7, 2000 and entitled "Dry Erase Products."

FIELD OF THE INVENTION

This invention relates generally to dry erase boards. More specifically, the invention relates to a flexible, dry erase member which may be adhered to a variety of surfaces. The invention also relates to specific compositions for providing a dry erase surface.

BACKGROUND OF THE INVENTION

Dry erase marking boards comprise a generally rigid substrate such as fiberboard or metal having a surface coated with smooth, hard material such as enamel or the like. The coating operates to receive and releasably retain a marking composition thereupon. The marking composition typically comprises solvent-based ink, and the marker board surface has only a modest affinity for the dried ink; therefore, the ink can be easily removed from the surface by wiping with an eraser, sponge or cloth. Dry erase marking boards have a number of advantages over heretofore employed chalkboards, and their use has steadily increased in recent years.

Dry erase marker boards provide a high contrast dark-on-light image, and can be used in combination with highly colored inks to produce a very readable, high contrast display. Also, dry erase marker boards produce significantly less dust than do chalkboards. Since chalkboard dust has now been identified as a contributing factor in asthma and as a source of damage to computer equipment and the like, dry erase marker boards are rapidly replacing conventional chalkboards in schools and business places.

While dry erase marker boards have a number of advantages over chalkboards, a number of problems are still associated therewith. Over time, the surface of dry erase marker boards begins to degrade, and the boards tend to retain traces of marking compositions. This problem is referred to in the industry as "ghosting." While ghosting can be removed, to some degree, by the use of liquid cleaners, the severity of the problem tends to increase over time, and eventually the marker board must be replaced. Also, while dry erase marker boards produce significantly less dust than do chalkboards, creation of dust is still something of a problem. Also, heretofore employed dry erase marker boards, like chalkboards, tend to be heavy, rigid items, and this lack of portability does inhibit the extent of their use.

The prior art has heretofore attempted to prepare flexible sheet stock having dry erase properties, in an effort to solve various of the above-discussed problems. For example, U.S. Pat. No. 5,037,072 discloses prior art attempts to utilize sheets of polymeric material as a dry erase surface. As detailed therein, such materials are quickly deformed and degraded by most dry erase marking compositions. The '072 patent further discloses coating a sheet of flexible stock material with a radiation cured lacquer, to provide a dry erase surface. As will be disclosed in detail hereinbelow, the present invention provides an improved dry erase coating which can be applied to a variety of substrate materials, and which does not require a radiation curing step. The coating of the present invention provides a highly durable, flexible dry erase surface which can accept and releasably retain a wide variety of marking compositions including solvent-based inks, crayons, grease pencils and the like. In addition, the dry erase surface of the present invention can be permanently imaged by the use of a xerographic copier or a laser printer, since the coated surface will permit a toner material to be fused, and permanently retained, thereto.

As will be explained in detail hereinbelow, the present invention provides a stock material which can be utilized to replace and renew the surface of old marker boards. In addition, the present material can be adapted to a variety of unique uses for education and business. Furthermore, the articles of the present invention can include an integral dust catching portion. These and other advantages of the present invention will be apparent from the drawings, discussion and description which follow.

BRIEF DESCRIPTION OF THE INVENTION

There is disclosed herein a dry erase member having a surface which is operable to receive and releasably retain a marking composition. The member includes a sheet of substrate material having opposed first and second faces. A layer of dry erase coating is disposed on the first face of the substrate. The dry erase coating includes a first member which can be cellulose acetate propionate or a fluoroethylene alkyl vinyl ether copolymer. The composition may further include a melamine resin. In specific embodiments, the member includes a layer of adhesive on the second surface of the substrate. This adhesive allows the member to be affixed to a variety of surfaces, and in specific embodiments is a repositionable adhesive. The substrate material may include paper or polymers.

In accord with another aspect of the present invention, a dry erase surface includes a body of adhesive material affixed to a portion thereof. The adhesive material functions to capture and retain dust particles, and is preferably disposed near a bottom perimeter of the dry erase surface.

DETAILED DESCRIPTION OF THE INVENTION

The present invention includes a dry erase member having a surface which can be marked by fluid based inks, grease pencils, crayons and the like. The surface releasably retains the marking composition so that the composition can be easily removed by wiping with a felt eraser, sponge, cloth or the like. It is a notable feature of the present invention that the dry erase coating composition thereof can be applied to a variety of substrates, including flexible substrates. The present invention can be implemented in a variety of configurations, and can be adapted to a number of diverse and specific uses.

Figure 1:
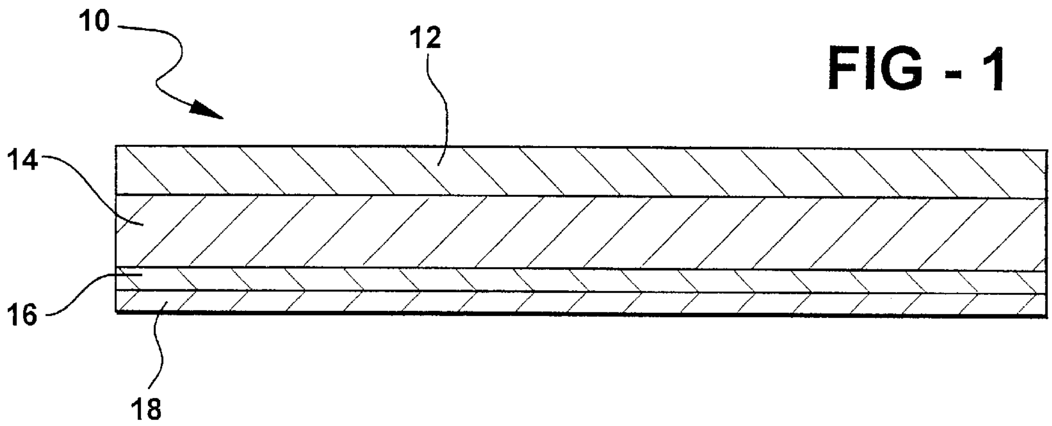
FIG. 1 is a cross-sectional view of one embodiment of dry erase member structured in accord with the principles of the present invention.

Referring now to FIG. 1, there is shown one particular dry erase member 10 structured in accord with the principles of the present invention. Member 10 of FIG. 1 includes a dry erase coating 12 which is disposed upon a first face of a substrate material 14. In the illustrated embodiment, a body of adhesive material 16 is disposed on the second face of the substrate 14, and the adhesive material 16 is covered by a protective layer of release material 18.

In the FIG. 1 embodiment, the dry erase coating 12 is most preferably one of the specific coating formulations of the present invention, as will be described in detail hereinbelow. Such coating compositions provide a dry erase surface which is highly durable, resistant to ghosting, and which can receive and releasably retain a variety of marking compositions which include grease pencils and crayons, as well as conventional solvent based dry erase markers. As will further be explained in detail hereinbelow, the specific dry erase compositions of the present invention are also capable of being permanently marked by fusible toners of the type used in laser printers and xerographic copiers. The substrate 14 used in the FIG. 1 embodiment can comprise any body of material having a reasonable degree of dimensional stability. Most preferably, the substrate 14 is a flexible substrate which may be comprised of paper, polymeric material, thin metal, or the like. While there is no limit on thickness, most embodiments of the present invention will employ a substrate body having a thickness in the range of 3–10 mils. In specific embodiments, thicker or thinner substrates may be employed. In some particular embodiments, the substrate may be comprised of a rigid body of material such as glass, metal, fiberboard, wood or the like.

The body of adhesive material 16 in the FIG. 1 embodiment allows the dry erase member 10 to be adhered to various surfaces such as walls, desktops, chalkboards and the like. In specific applications, the dry erase material 10 of the FIG. 1 embodiment can be adhered to an existing dry erase marker board so as to renew the surface thereof. Most preferably, the adhesive 16 is a repositionable adhesive, and such materials are known in the art to comprise relatively low tack adhesives which can be releasably and repeatably adhered to a variety of substrates. A body of release material 18 protects the adhesive layer 16 during shipping and handling. As is known in the art, such release materials can comprise paper or other substrates coated with a release coating, which is preferably a fluoropolymer or a silicon material.

The dry erase member 10 of FIG. 1 can be implemented in a variety of configurations, and can thus be adapted to a variety of uses. In some instances, the dry erase member 10 incorporates an opaque substrate 14 comprised of paper or polymer material. Such embodiments provide a conventional dry erase surface which can be adhered to a wall, a chalkboard, an easel, or an existing marker board so as to provide a dry erase surface. The dry erase member can also be used as a projection screen, in which case, the dry erase characteristics will allow for supplementation of the image projected thereupon. In other instances, the substrate 14 can be a transparent body of material which can be used in connection with a projection device such as an overhead projector. In other instances, a transparent substrate based material can be used as an overlay device to provide a dry erase surface on maps, photographs, billboards, or other previously printed materials. Such embodiments have significant utility in schools, government institutions and business.

The dry erase member of the present invention can be adhered to desktops and the like to render the surface thereof dry erasable. Such embodiments have particular utility in primary education. The substrate member 14 can be imprinted with specific markings such as guidelines, musical staffs or the like prior to the application of the coating 12 thereonto. In this manner, erasable educational materials can be readily prepared. It is a particularly notable feature of the present invention that specific dry erase compositions disclosed herein provide a surface which is capable of being permanently marked by a laser printer or xerographic copier. This ability allows customized, permanent markings to be made onto the dry erase member, and has significant utility for teachers.

The dry erase member of the present invention may be employed in a variety of other configurations. For example, the flexibility and mountability of the material of the present invention makes possible its use as a portable, relatively large area dry erase presentation board. The board itself is comprised of a body of dry erase material of the present invention having a mounting adhesive on one side thereof. The flexible nature of the material allows the presentation board to be rolled for storage and placed into a tubular container. The container may also be used to store markers, an eraser and other items used in a presentation. The portability of this embodiment of the invention makes its use very attractive in sales presentations, on-site briefings and the like. In other embodiments, the flexible, dry erase material of the present invention can be used to make restaurant placemats which are markable and erasable. Such placemats may or may not include an adhesive backing, and because of their printability are a promotional item particularly attractive to children.

Figure 2:
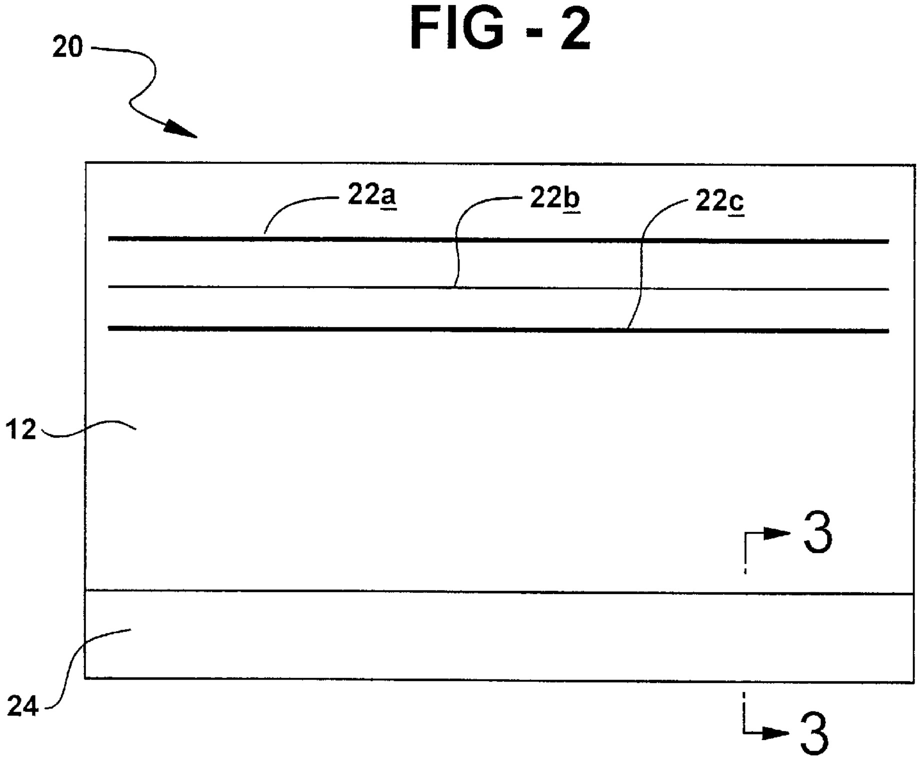
FIG. 2 is a plan view of another embodiment of dry erase member structured in accord with the principles of the present invention.

Referring now to FIG. 2, there is shown another embodiment of dry erase member 20 structured in accord with the principles of the present invention. The dry erase member 20 of FIG. 2 is shown in a top plan view, in an orientation adapted for use, and having the dry erase coating 12 on an uppermost surface thereof.

As illustrated in FIG. 2, permanent markings 22A, 22B, 22C are applied to the dry erase coating 12. These markings 22 are most preferably comprised of a body of fused toner material applied by a laser printer or xerographic copier. In the FIG. 2 embodiment, the markings are configured to assist in a child in learning to write. In other embodiments, the markers can comprise Cartesian coordinates, a music scale or the like.

As discussed hereinabove, creation of dust is a significant problem with chalkboards and still is a considerable problem with dry erase boards. The FIG. 2 embodiment includes dust catching strip 24 which greatly minimizes the problem of dusting. The strip 24 comprises a body of adhesive material coated onto the front surface of the substrate, either atop or adjacent to the dry erase coating. This adhesive strip is most preferably disposed proximate the bottom perimeter of the device. When the board is in use and being erased, a user can simply draw the eraser over the adhesive strip 24 so as to capture and retain dust particles thereonto. In specific embodiments, the adhesive dust catching strip 24 can be protected by a body of release material which may be left in place during the use of the board and removed at the time that erasure takes place. In other embodiments, the body of adhesive material can be unprotected and exposed during the entire time the board is in use. In other specific embodiments, the dust catching adhesive strip 24 can be made renewable. For example, the strip can comprise a two-sided body of adhesive which can be peeled away from the top surface of the dry erase member 20 and replaced by a fresh member so as to renew the adhesive surface. In other embodiments, a stack of adhesive strips can be disposed on the dry erase member, and the adhesive surface can then be renewed by simply peeling away the soiled strip so as to expose a fresh surface.

Figure 3:
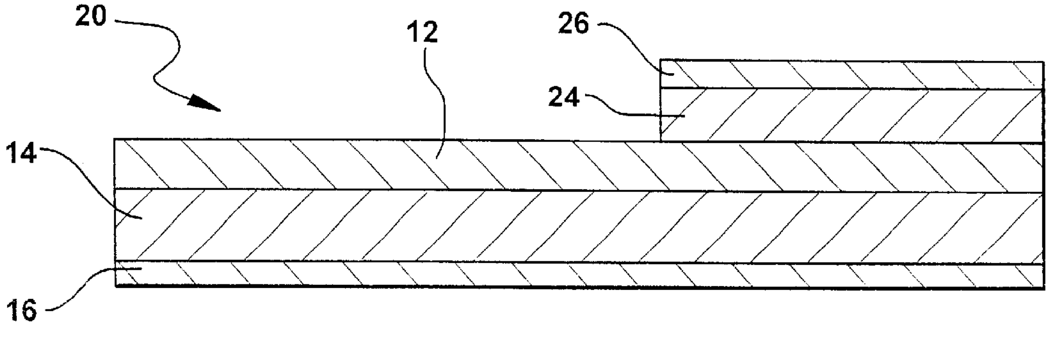
FIG. 3 is a cross-sectional view of the dry erase member of FIG. 2 taken along line III—III.

Referring now to FIG. 3, there is shown a cross-sectional view of the dry erase member 20 of FIG. 2 taken along line III—III, and better illustrating the structure of the adhesive, dust control strip. As shown in FIG. 3, the dry erase member 20 includes a substrate 14, dry erase coating 12, and mounting adhesive 16 as previously described. The member 20 further includes a dust catching strip of adhesive material 24 disposed on a portion of the dry erase surface. As illustrated in FIG. 3, the adhesive 24 is protected by a strip of release material 26, which can comprise a body of polymeric material or a body of paper having limited adherence to the adhesive 24.

The dry erase member of the present invention can be prepared in many configurations, utilizing a variety of materials. The substrate member, as noted above, is in most embodiments preferably made from a flexible body of material such as a body of paper or polymer. Typically, the substrate has a thickness in the range of 3–10 mils. The substrate may be transparent or opaque. Transparent substrates are favored in those instances where the dry erase member is used as an overlay sheet for maps, posters or the like, or where the dry erase member is used as a transparency for a projector. As previously noted, in some instances the substrate is a body of rigid material.

In those embodiments wherein an adhesive layer is disposed on the rear surface of the dry erase member, that adhesive is most preferably a repositionable, pressure sensitive adhesive. Such adhesive compositions are well known in the art and are widely used in connection with graphic displays and adhesive memo pads such as those sold by the 3M Corporation under the trademark "Post-It"®. One such repositionable, pressure sensitive adhesive is comprised of:

| | |
|---|---|
| Waterborne acrylic copolymer adhesive (30% solids) | 49.9% by wt. |
| Distilled water | 49.9% by wt. |
| Defoamer sold by Air Products Inc. under the designation Surfonyl DF-75 | 0.2% by wt. |

Other repositionable adhesive formulations may be similarly employed. In certain embodiments, repositionability is not desired and the adhesive may comprise a more permanent pressure sensitive adhesive. In some specific embodiments, such as projection transparencies and the like, the adhesive layer may be eliminated completely.

As is known in the art, the adhesive layer can be protected by a release member such as a sheet of coated paper or polymer. In those instances where the dry erase members of the present invention are sold in pad form, the dry erase coating of one member may function as a release layer for an overlying body of adhesive of another member.

As discussed in detail above, particular embodiments of the present invention may include an adhesive dust catching strip on the front surface of the dry erase member. This adhesive may comprise any of the adhesive compositions, including repositionable and non-repositionable adhesives, employed on the back side of the dry erase member.

The dry erase coating is disposed on the first face of the substrate. This coating should be capable of receiving and releasably retaining marking compositions, particularly conventional dry erase markers of the type which include a solvent based ink. It is also very desirable that the dry erase coating be capable of receiving and releasably retaining crayons and grease pencils. In those instances where the dry erase member includes a flexible substrate, the dry erase coating should also be capable of flexing without delaminating or cracking. Finally, the dry erase coating should have sufficient durability to allow for long service life without ghosting or other degradation.

In accord with one aspect of the present invention there are provided some specific dry erase coatings having superior performance characteristics. These coatings can be applied to a variety of substrates to produce a flexible dry erase surface which can be used with conventional dry erase markers, grease pencils and crayons. The coating provided by these compositions is durable and resistant to ghosting. Furthermore, the coatings of the present invention can be permanently marked by fusing a body of toner material thereonto; thus, dry erase members utilizing the coating of the present invention can be imaged by conventional photocopy machines, laser printers, facsimile machines and the like.

One specific dry erase coating can be prepared from the following composition, wherein all amounts are given in weight percentage:

| | |
|---|---|
| Acetone | 48.4% |
| Methanol | 28.5% |
| Propylene glycol methyl ether (Dowanol PM ®) | 7.9% |
| Cellulose acetate propionate (20 seconds) | 13.0% |
| Modified melamine-formaldehyde resin | 1.9% |
| Methane sulfonic acid, anhydrous | 0.3% |

In this composition, the cellulose acetate propionate has a viscosity characterized by the falling ball method, as is known in the industry. The foregoing composition can be readily coated onto a variety of substrates, and one particularly preferred substrate comprises polyester. Coating can be advantageously accomplished utilizing a variety of standard coating techniques such as draw bar coater, wire bar coater, extrusion coater or the like. The foregoing solution is typically coated onto a substrate at a thickness of approximately 0.3 to 5.0 mils, and more preferable 0.65 to 2.6 mils, and dried at a temperature of 280° to 300° F. for approximately one to two minutes so as to produce a hard dry erase surface having a thickness of approximately 0.05 to 1 mil, and preferably 0.1 to 0.4 mils.

Another dry erase coating of the present invention can be prepared from a solution comprising, by weight:

| | |
|---|---|
| Acetone | 10.26% |
| Methanol | 10.26% |
| Toluene | 30.80% |
| Fluoroethylene alkyl vinyl ether copolymer (Lumiflon ® 200 sold by Asahi Glass Company) | 42.65% |
| Hexamethoxymethylmelamine (Cymel ® 303 sold by the Cytec Corporation) | 5.13% |
| Blocked para-toluene sulfonic acid (Nacure ® 2530 sold by King Industries) | 0.92% |

The foregoing composition can be coated and dried as above to produce a coating comprised of approximately 87.6% of the fluorinated resin, 10.6% of the melamine, and 1.8% of the acidic curing agent. The thus produced coating is durable, flexible, and capable of being used with a variety of marking compositions.

In view of the foregoing, yet other variations of the coatings of the present invention can be prepared. For example, other cellulose polymers such as cellulose acetate butyrates, or other grades of cellulose acetate propionates can be employed in the coating as a first or major component. Likewise, other fluorinated polymers may be employed as the major component. In general, the first component will comprise, by weight, approximately 60–95% of the final coating. The coating also includes a second component which is most preferably a melamine resin, typically in an amount of 5–40% by weight of the coating. While some preferred coating thicknesses are disclosed, in some applications thicker or thinner coatings may be employed.

Yet other combinations of polymer materials may be employed to form the dry erase surface of the present invention. In one embodiment, the fluoroethylene alkyl vinyl ether described hereinabove can be cured with a blocked polyisocyanate compound as is known in the art. The dry erase surface can also be prepared from a silicone-polyester copolymer which is cured with a melamine-formaldehyde cross linker. Yet other dry erase coatings can comprise hydroxylated acrylic resins cured with the melamine-formaldehyde cross linker. In some instances, self cross linked melamine-formaldehyde resins may also be employed as dry erase coatings, and in such embodiments, plasticizing materials such as urethane diols are typically added to improve flexibility. All of the foregoing compositions are thermally curable. Ultraviolet cured systems may also be employed in the present invention. For example, the above referenced fluoroethylene alkyl vinyl ether compounds can be cured with cycloaliphatic epoxide resins, in which instance photoinitiators are used to effect curing. Typical photoinitators for a system of this type comprise aryl sulfonium salts.

In view of the teachings presented herein, yet other coating compositions, embodiments, and applications of the present invention will be readily apparent to one of skill in the art. The foregoing are merely meant to illustrate particular embodiments of the invention, but are not meant to be limitations upon the practice thereof. It is the following claims, including all equivalents, which define the scope of the invention.

What is claimed is:

1. A dry erase member having a surface operable to receive and releasably retain a marking composition, said member comprising:

a sheet of substrate material having opposed first and second faces; and a layer of a dry erase coating disposed on the first face of said substrate, said dry erase coating comprising a first material selected from the group consisting of: fluoroethylene alkyl vinyl ether copolymer and cellulose acetate propionate; and a layer of adhesive disposed on the second face of said substrate.

2. The dry erase member of claim 1, wherein said dry erase coating comprises a second material which is a melamine resin.

3. The dry erase member of claim 2, wherein said melamine resin is a hexamethoxymethylmelamine resin when said first material is said fluoroethylene alkyl vinyl ether copolymer, and said melamine resin is a melamine-formaldehyde resin when said first material is said cellulose acetate propionate.

4. The dry erase member of claim 1, wherein said adhesive is a repositionable adhesive.

5. The dry erase member of claim 1, wherein said substrate comprises paper.

6. The dry erase member of claim 1, wherein said substrate comprises a polymeric material.

7. The dry erase member of claim 6, wherein said substrate is opaque.

8. The dry erase member of claim 1, further characterized in that said coating is capable of receiving, and having fused thereonto, a layer of xerographic toner material.

9. The dry erase member of claim 1, wherein said coating has a thickness of approximately 0.1–0.4 mils.

10. The dry erase member of claim 9, wherein said substrate has a thickness in the range of 3–10 mils.

11. The dry erase member of claim 2, wherein said first material comprises, by weight, 60–95% of said coating, and said second material comprises, by weight, 5–40% of said coating.

12. The dry erase member of claim 1, wherein said coating further includes an acidic catalyst.

* * * * *